United States Patent [19]
Dehaene

[11] Patent Number: 4,461,012
[45] Date of Patent: Jul. 17, 1984

[54] TRANSMITTER AND RECEIVER FOR TRANSMITTING DIGITAL SIGNALS

[75] Inventor: Jean P. Dehaene, Paris, France

[73] Assignee: Thomson-CSF, Paris, France

[21] Appl. No.: 240,285

[22] Filed: Mar. 4, 1981

[30] Foreign Application Priority Data

Mar. 5, 1980 [FR] France ................................. 80 04947

[51] Int. Cl.³ ........................................... H04L 27/12
[52] U.S. Cl. ....................................... 375/62; 375/37; 375/48
[58] Field of Search ...................... 375/17, 19, 37, 44, 375/55, 59, 62, 45, 48; 360/40, 44, 39, 48; 332/10

[56] References Cited
U.S. PATENT DOCUMENTS
3,048,784 8/1962 Scherer ................................. 375/37

Primary Examiner—Marc E. Bookbinder
Attorney, Agent, or Firm—Cushman, Darby & Cushman

[57] ABSTRACT

The transmitter comprises a multiplication circuit which receives on the one hand the digital signals and on the other hand, from a frequency generator, a signal with the timing of the digital signals. The signal obtained by this multiplication makes it possible to generate in the frequency modulator of the transmitter a carrier line which does not suffer from phase noise. Thus, it is possible to perform a coherent demodulation in a receiver which cooperates with the transmitter.

2 Claims, 3 Drawing Figures

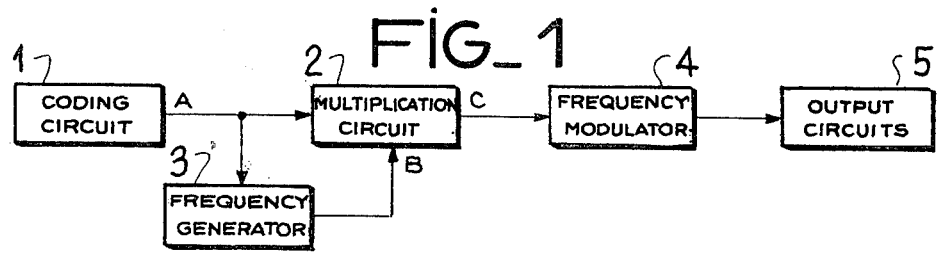
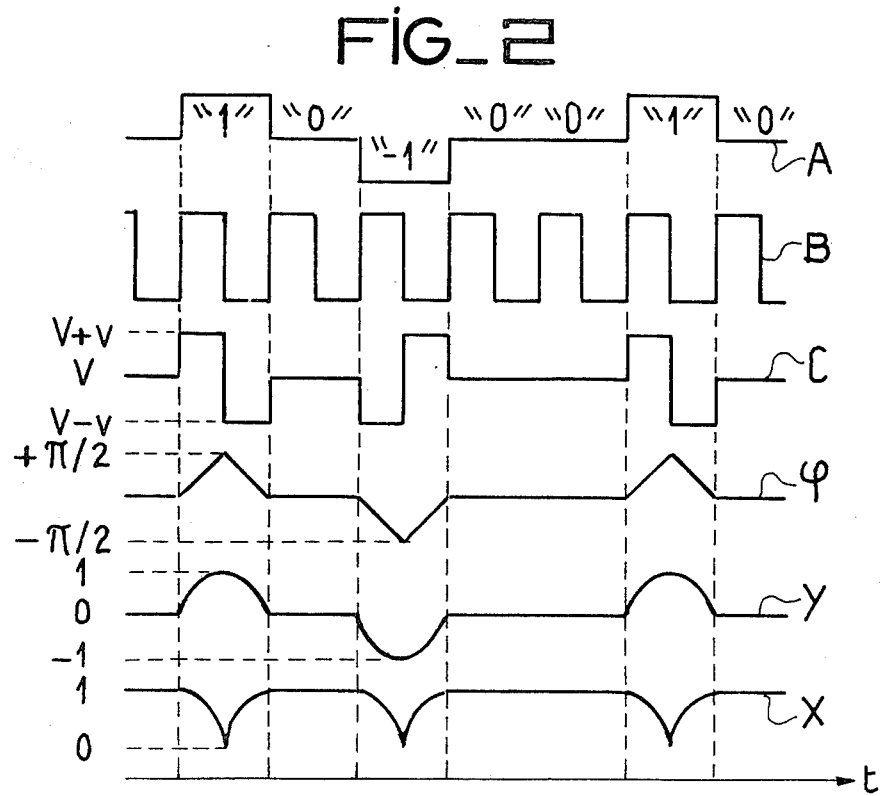
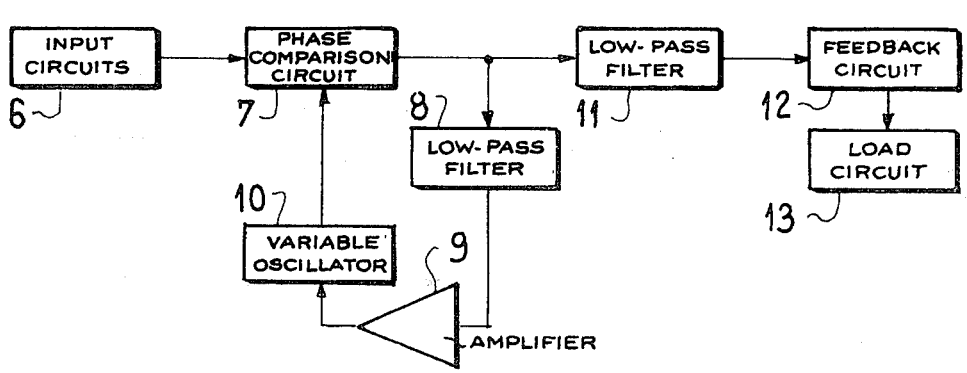

TRANSMITTER AND RECEIVER FOR TRANSMITTING DIGITAL SIGNALS

BACKGROUND OF THE INVENTION

The present invention more particularly relates to a transmitter for transmitting digital signals having a zero direct current component and comprising: an input means receiving digital signals, a frequency modulator and coupling means between the aforementioned input means and the frequency modulator input.

It is known to perform an analog transmission of digital signals having a zero d.c. component. Transmission can take place by means of a system using frequency modulation on transmission and demodulation by discriminator on reception. However, such a system is incoherent, the information being detected with respect to the preceding information which can contain errors and not with respect to a reference of the transmission support. It is also known to transmit digital signals having a zero d.c. component by decoding said signals prior to their transmission and coding them during their reception. However, information losses may arise due to the decoding and coding operations.

It should be noted that it is also known to transmit digital signals having a zero d.c. component by phase modulation. On reception the signal at intermediate frequency has a spectrum corresponding to the translated spectrum of the digital signal and without a carrier frequency. In order to retrieve the carrier it is then necessary to proceed in conventional manner with, in particular, a multiplication by two of the signal. However, such a multiplication leads to a threshold effect due to the S/N ratio at the multiplier input and to jitter due to modulation residues.

BRIEF SUMMARY OF THE INVENTION

The present invention aims at obviating the aforementioned disadvantages by multiplying on transmission the digital signal modulated by its own timing.

According to the invention this is achieved by a transmitter for transmitting digital signals having a zero direct current component comprising a port for receiving the digital signals, a frequency modulator having a signal input and coupling means for coupling the port to the signal input of the frequency modulator, whilst for generating a line at the carrier frequency in the signal to be transmitted the coupling means comprise: a multiplication circuit having a first input coupled to the port, a second input and an output coupled to the frequency modulator input and a frequency generator having an input coupled to the port and an output coupled to the second input of the multiplication circuit to supply a signal whose frequency is equal to the timing of the digital signals.

The present invention also relates to a receiver for receiving a transmission signal having a line at the carrier frequency and serving to transmit digital signals having a zero direct current component, this receiver comprising: a phase comparison circuit having first and second inputs and an output for supplying a zero output signal when it receives signals in quadrature at its two inputs, a modulated signal input coupled to the first input of the phase comparison circuit, a loop filter having an output and an input coupled to the output of the phase comparison circuit, a variable oscillator having an input coupled to the output of the loop filter and an output coupled to the second input of the phase comparison circuit, and an information filtering device coupled to the output of the phase comparison circuit.

BRIEF DESCRIPTION OF THE DRAWINGS

The invention is described in greater detail hereinafter relative to non-limitative embodiments and with reference to the attached drawings, wherein show:

FIG. 1 the circuit diagram of a transmitter according to the invention.

FIG. 2. a graph relating to the signals of the transmitter of FIG. 1.

FIG. 3 the circuit diagram of a receiver according to the invention.

DETAILED DESCRIPTION OF THE PREFERRED EMBODIMENTS

FIG. 1 shows a coding circuit 1, which supplies a signal A coded in accordance with code HDB3 (high density bipolar code having no more than three consecutive zeros). Signal A represents the information supplied to circuit 1. The signal supplied by the coding circuit (curve A in FIG. 2) is coded according to the HDB3 code and on the basis of the coding principle itself has no energy at the zero frequency. This signal formed from elements "0", "1" and "−1" of duration T is applied to the first input of a multiplication circuit 2 receiving at its second input a square-wave signal 3 (curve B in FIG. 2). This square-wave signal has a frequency equal to 1/T, which therefore corresponds to the timing $f_r$ of the coded signal. Timing coded signal timing or data rate here and in the claims is understood to mean the frequency corresponding to the period of value equal to minimum duration T of each of the coded signal states. In the present case a single state corresponds to each information element "1" "0" "−1", so that the timing $f_r$ is equal to the information flow rate. Thus, $f_r = 34$ MHz. A frequency generator 3, synchronized with the coded signal fronts, supplies said square-wave signal.

Signal C supplied by the multiplication circuit (curve C in FIG. 2) is applied to the input of a frequency modulator 4 to be transformed into a signal at intermediate frequency. This signal is applied to output circuits 5 comprising a frequency inversion circuit and a transmitting antenna.

The multiplication of the signal coded by its own timing in circuit 2 can be interpreted as a sort of differentiation which compensates the integration created by the frequency modulator in the phase information obtained at its output.

The multiplication circuit signal C has an amplitude V during the time T of "0" of the coded signal supplied by coding circuit 1, amplitudes V+v and V−v respectively during the first and second halves of the time T of "1" of the coded signals and amplitudes V−v and V+v respectively during the first and second halves of the time T of the "−1" of the coded signal. The frequency modulator 4 transforms the signals of amplitude V, V+v and V−v respectively into signals of frequency F, F+dF and F−dF. The modulator setting and the choice of the values V and v are such that the phase variation to which is equivalent the frequency jump due to the voltage V±v applied to the modulator during times equal to T/2 is ±π/2. This phase variation of the carrier frquency modulated by signal C is represented by curve φ in FIG. 2.

FIG. 2 also shows two curves Y and X giving the Y and X coordinates, as a function of time, of the representative vector OM on a unit circle diagram of the phase variation of the carrier obtained at the output of the frequency modulator. In other words these curves give the coordinates of the vector OM, whose end describes the unit circle with axes OX and OY, whilst forming with the OX axis the angle $\phi$ defined by the curve $\phi$ in FIG. 2.

The coded signal A (FIG. 2) carrying the information HDB3 occurs in sine-wave form in coordinate Y of angle $\phi$.

Coordinate X has a d.c. component, whose amplitude is modulated by the information. By giving in the manner indicated in FIG. 2 the values 0 and 1 respectively to the minimum and maximum amplitudes the d.c. component can vary from ampltiude 1 (in the case of successive "0") to amplitude $2/\pi$ (case of a sequence of "1" and "$-1$").

Thus, the signal at intermediate frequency supplied by the frequency modulator 4 (FIG. 1) is formed from two channels, namely a channel Y containing the information and a channel X whose frequency spectrum contains an impulse at the carrier frequency which, on reception, will make it possible to retrieve a carrier for coherently demodulating channel Y. It should also be noted that this carrier does not suffer from phase noise, because channel Y has no energy density at low frequencies (HDB3 code). Thus, the coherent phase demodulation on reception is simplified.

FIG. 3 is the circuit diagram of a receiver for cooperating with the transmitter of FIG. 1.

FIG. 3 shows the input circuits 6 of the receiver. These input circuits more particularly comprise a receiving antenna and frequency inversion circuits making it possible to obtain at the output of the input circuits a signal at intermediate frequency corresponding to the signal at intermediate frequency supplied by frequency modulator 4 of FIG. 1.

This intermediate frequency signal is applied to the first input of a phase comparison circuit 7, whose output is connected to the input of a filter 8. The output signal of filter 8 is amplified by a tunable amplifier 9, whose output is connected to the control input of a variable oscillator 10. The variable oscillator output is connected to the second input of the phase comparison circuit 7. The output of comparison circuit 7 is also connected to the input of a filter 11, followed by a feedback circuit 12, itself followed by a load circuit 13.

Components 8, 9 and 10, together with the phase comparison circuit 7, form a conventional phase feedback loop. This loop serves to retrieve the carrier in the intermediate frequency signal supplied by the input circuits 1.

In this loop the phase comparison circuit is a ring mixer, whose output signal has a value zero when the signals at its two inputs are in quadrature. Filter 8 is a conventional low-pass filter designed for determining a feedback of the second order with the feedback loop, i.e. a feedback whose transfer function has two poles. The equivalent noise band of the loop used, for example, in the present description, is approximately one tenth of the information flow, i.e. one tenth of the timing, i.e. $f_r/10 = 3.4$ MHz.

Phase feedback is effected by a quadrature, i.e. the carrier of the intermediate frequency signal and the signal $V_o$ supplied by the variable oscillator, when fed back are displaced by $\pi/2$. The phase comparison operation is a scalar product, the carrier received being mixed with the signal $V_o$ supplied by the variable oscillator in quadrature, or in other words which is in phase with the channel Y carrying the information. Thus, the scalar product of signal $V_o$ with the carrier (channel X) gives a zero result. However, the signal of channel Y supporting the information is in phase with the signal $V_o$, so that the information can be directly recovered at the output of phase comparison circuit 7 for processsing and then use. In conventional manner processing consists of filtering followed by feedback. Filtering is performed by the low-pass filter 11 which is a Nyquist-type filter, whose hand is approximately half the information flow, i.e. half the timing or $f_r/2 = 17$ MHz.

The digital signal transmission system described hereinbefore has been designed for easily adapting the existing analog radio link connections to digital transmission. Such digital signal transmission systems can be used for producing simple, inexpensive installations.

Without passing beyond the scope of the invention it is possible to conceive other digital information transmission systems, particularly systems where the information is not coded according to code HDB3, but according to another code such that the signal obtained has no energy density at zero frequency, in the same way as with the HDB code. Furthermore, the number n of states of the amplitude of this coded signal can differ from 3 as in the present embodiment and can, for example, be 2 or 4.

It is also possible to use for the multiplication operation performed in the transmitter a frequency generator supplying a sine-wave signal instead of a square-wave signal resulting in slightly different spectral configurations because there is then a modulation of the spectrum. However, reception is still possible by means of a receiver according to FIG. 3.

What is claimed is:

1. A transmitter for transmitting a signal frequency modulated in accordance with encoded digital signals having a data rate, said digital signals having leading edges and a zero direct current component, said transmitter comprising:

a port for receiving said digital signals;

a frequency modulator for frequency modulating a carrier frequency with a coupled signal; and coupling means, connecting said port to said frequency modulator, for generating said coupled signal which, when modulated onto said carrier frequency by said frequency modulator, enables said frequency modulator to produce a signal to be transmitted having a component at said carrier frequency, said coupling means including:

frequency generating means, connected to said port, for generating square-wave signals at a frequency equal to said data rate, said square-wave signals being synchronized with said leading edges of said digital signals, and a multiplication circuit having a first input coupled to said port, a second input coupled to said frequency generating means and an output coupled to said frequency modulator.

2. A transmitter as in claim 1 wherein said digital signals are encoded in accordance with code HDB3.

* * * * *